United States Patent [19]
Flower

[11] Patent Number: 5,135,237
[45] Date of Patent: Aug. 4, 1992

[54] BRUSH SEAL WITH ASYMMETRICAL ELEMENTS

[75] Inventor: Ralph F. J. Flower, Bath, England

[73] Assignee: Cross Manufacturing Company (1938) Limited, Bath, England

[21] Appl. No.: 821,305

[22] Filed: Jan. 13, 1992

Related U.S. Application Data

[63] Continuation of Ser. No. 504,333, Apr. 3, 1990, abandoned.

[30] Foreign Application Priority Data

Apr. 5, 1989 [GB] United Kingdom ............... 8907695

[51] Int. Cl.$^5$ .................................................. F16J 15/48
[52] U.S. Cl. ...................................... 277/53; 277/227; 277/DIG. 6
[58] Field of Search ...................... 277/53, 54, 55, 56, 277/57, DIG. 6, 227

[56] References Cited

U.S. PATENT DOCUMENTS

| | | | |
|---|---|---|---|
| Re. 30,206 | 2/1980 | Ferguson et al. | 277/53 |
| 2,011,206 | 8/1935 | Vandermeer | 277/53 |
| 2,233,579 | 3/1941 | Bowers | 277/53 |
| 3,916,054 | 10/1975 | Long et al. | 277/53 |
| 4,202,554 | 5/1980 | Snell | 277/53 |
| 4,460,185 | 7/1984 | Grandey | 277/53 |
| 4,526,509 | 7/1985 | Gay, Jr. et al. | 277/53 |
| 4,600,202 | 7/1986 | Schaeffler | 277/53 |
| 4,678,113 | 7/1987 | Bridges et al. | 277/53 |

FOREIGN PATENT DOCUMENTS 0203140 11/1988 European Pat. Off. .............. 277/53

Primary Examiner—William A. Cuchlinski, Jr.
Assistant Examiner—Daniel G. DePumpo

[57] ABSTRACT

A seal member for effecting a seal between a shaft intended to rotate at high rates and a housing through which the shaft extends has a carrier for mounting on one of the shaft or housing and a plurality of generally radially extending seal elements adapted to wipe on the other of the shaft or housing. Each seal element is in the form of a flexible strip the width of which in the axial direction is significantly greater than the strip thickness, whereby the strips exhibit great stiffness axially, but may flexibly seal in the circumferential direction.

8 Claims, 2 Drawing Sheets

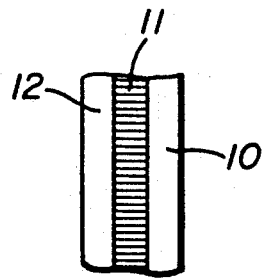 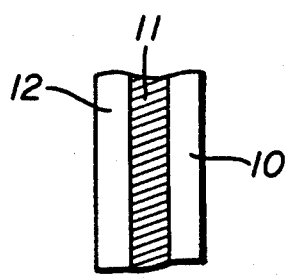 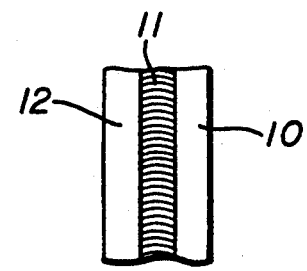
FIG-4    FIG-5    FIG-6
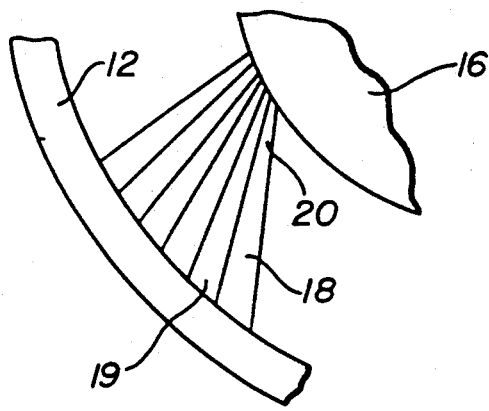
FIG-7
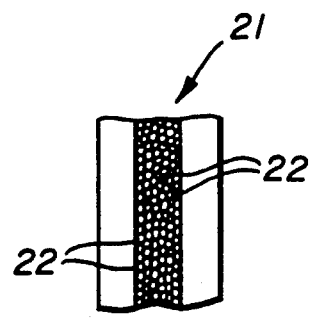
FIG-8
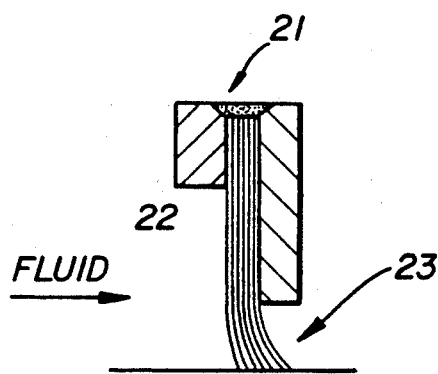
FIG-9A
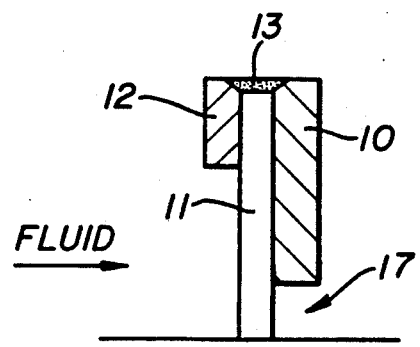
FIG-9B

BRUSH SEAL WITH ASYMMETRICAL ELEMENTS

BACKGROUND OF THE INVENTION

A) Field of the Invention

This invention relates to a seal member adapted to effect a seal between a rotatable shaft and a housing through which that shaft extends.

B) Description of the Prior Art

It is frequently necessary to effect a fluid-tight seal between a rotatable shaft and a housing containing the shaft, the housing has a bore through which the shaft extends. There are innumerable designs of seal members intended for this purpose and a machine designer has to select the most appropriate type, having regard to the operating conditions.

In the case of shafts which rotate at relatively high speeds and in the presence of pressurised hot gasses, such as are encountered in the case of gas turbines and jet engines, various designs of brush seals have been developed, on account of the unsatisfactory performance of more simple seals having a synthetic elastomeric annular sealing member which bears on the shaft. In such a brush seal, a plurality of fine bristles (such as of bronze or stainless steel wire) are held in a carrier mounted on the housing, the tips of the bristles wiping against the shaft so as to effect a seal thereagainst.

Experience shows that though a brush seal as described above initially may perform satisfactorily, the efficiency of the seal tails off after an extended period of use. This has been found to be due, at least in part, to the bristles losing apparent flexibility on account of debris accumulating in the spaces between individual bristles. That problem may be compounded by the debris oxidizing and then occupying an even greater volume. In an attempt to reduce this problem, it has been suggested that each bristle should be of an elliptical cross-section, rather than of a strictly circular cross-section, in an attempt to increase the packing density of the bristles and so to reduce the volume of the interstices between the bristles. Though a seal with elliptical bristles may give a slightly improved performance, nevertheless it is still prone to a loss of efficiency after an extended period of time.

A further problem with brush seals having bristles of a circular cross-section is that the bristles tend to flex in the axial direction, away from the high pressure side of the seal towards the low pressure side. Bending of the bristles in this way reduces the effective radial length thereof, and so reduces the contact between the bristle tips and the shaft; in turn this reduces the sealing efficiency.

OBJECTS OF THE INVENTION

It is a principal object of the present invention to provide a seal member especially suitable for use between a housing and a shaft which is intended to rotate at relatively high speeds, and which seal member is able to perform satisfactorily for extended periods of time.

A further object of the invention is the provision of a seal member able to effect a seal between a shaft and a housing through which the shaft extends, which seal is able to withstand a relatively high pressure differential thereacross.

Yet another object of this invention is to provide a seal member specifically intended for use in gas turbine and jet engines to effect a seal between the engine rotor shaft and a housing, where the shaft rotates at relatively high rates and the seal member is subjected to hot gases at relatively high pressures.

SUMMARY OF THE INVENTION

In accordance with the foregoing and other objects, this invention provides a seal member for effecting a seal between a shaft and a housing through which the shaft extends, which seal member comprises an annular carrier adapted for mounting on one of the housing and the shaft, and a plurality of seal elements mounted on the carrier to extend generally radially therefrom, the tips of said seal elements remote from the carrier being adapted to wipe on the other of the housing and the shaft to effect a seal thereagainst, in which seal member each said seal element is in the form of a flexible strip the width of which in the general direction of the axis of the carrier is significantly greater than the thickness of the strip in the generally circumferential direction of the carrier.

It will be appreciated that in the case of a seal member of the present invention, each seal element is in the form of a flexible strip. Such seal elements may be packed very tightly together in the generally circumferential direction, with essentially no interstices between adjacent strips. In this way, the likelihood of debris collecting between the individual strips is much reduced, so that no significant loss of flexibility will result, after an extended period of use. In addition, the flexible strips exhibit a very high resistance to bending (that is, stiffness) in the axial direction, for example as a result of fluid pressure on one side of the seal member, whereby the tips of the strips may continue to wipe against the shaft (or housing, as appropriate) even if the seal member is subjected to high pressure differentials. This may be contrasted with a conventional brush seal, where fluid pressure tends to bend the bristles in the axial direction, so lifting the bristles clear of the shaft (or housing, as appropriate) resulting in an inadequate seal.

BRIEF DESCRIPTION OF THE DRAWINGS

In order that the invention may be well understood, preferred arrangements thereof will now be described and certain specific embodiments of the inventive seal member will be explained by way of example only, referring as necessary to the accompanying drawings, in which:

FIG. 4 is a view taken on arrow A shown on FIG. 2;

FIGS. 5 and 6 are views similar to that of FIG. 4 but on two alternative embodiments of seal;

FIG. 7 is a view similar to that of FIG. 1 but of yet another embodiment;

FIG. 8 is a view similar to that of FIG. 4, but on a conventional brush seal having circular bristles; and FIGS. 9A and 9B compare the performance of a conventional brush seal with a seal of the present invention.

DESCRIPTION OF THE PREFERRED EMBODIMENTS

Figure 1:
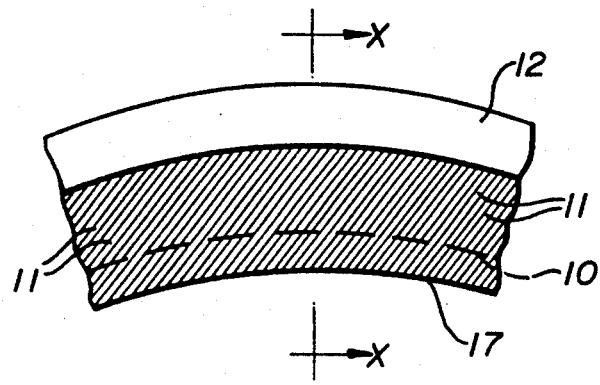
FIG. 1 is an end view on a part of a seal member of this invention.

In a seal member of this invention, it is preferred for each said flexible strip to be substantially planar, though each strip could be curved to some extent about its width, in the generally axial direction. Moreover, though it is preferred that each strip is set with its width lying strictly in an axial plane, nevertheless each strip could be set to lie at an angle to the axial direction.

Each flexible strip preferably is of a regular and uniform width and thickness throughout its length. It will however be appreciated that in view of the fact each strip extends generally radially, if the strips are packed solidly at the radially inner ends thereof, the radially outer ends thereof will be spaced apart to some extent. Depending upon the overall radial length of each strip, that clearance may not be of significance but if each strip has a sufficiently great radial extent, then each strip may be manufactured with a thickness which tapers from the radially outer end thereof towards the radially inner end, whereby plurality of the strips may be packed essentially solidly, for the entire radial extent thereof.

Though each flexible strip could extend strictly radially from the carrier, and indeed should so extend for a shaft which may rotate in either direction, nevertheless it is preferred for the strips to extend at an angle to the radial direction. The most preferred form of seal has an annular carrier adapted for mounting in the housing, with the flexible strips extending inwardly from the carrier at an angle to the radial direction such that the strips trail having regard to the intended direction of rotation of the shaft.

Each said flexible strip used in a seal member of this invention may be made of a metal or of a non-metal, having regard to the particular service application to which the finished seal member is to be placed. For some applications, it may be advantageous to use a combination of strips of metal and of non-metals, in a single seal member—for example, using strips alternately of metal and non-metal. Moreover, and especially for metal strips, these could be coated or surface-treated in order to enhance the rubbing properties thereof.

In order that a seal member of this invention may perform satisfactorily, it is important that the width of each flexible strip is significantly greater than the thickness thereof. Typically, the width may be at least five times as great as the thickness, and more preferably ten times as great, in order to give adequate stiffness to each strip in the axial direction, and so an enhanced sealing effect.

The carrier may be a single annulus from which the strips extend, or may be constructed in several parts adapted to interlock together so as thereby to form a complete annulus, in a manner similar to that described in our pending European Patent Publication No. 0,293,140 A2. Moreover, to obtain an enhanced sealing effect, the seal member may have two or more rows of flexible strips disposed adjacent one another in the axial direction.

Figure 2:
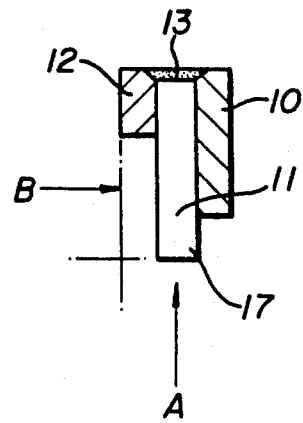
FIG. 2 is a sectional view taken on line X—X marked on FIG. 1.
Figure 3:
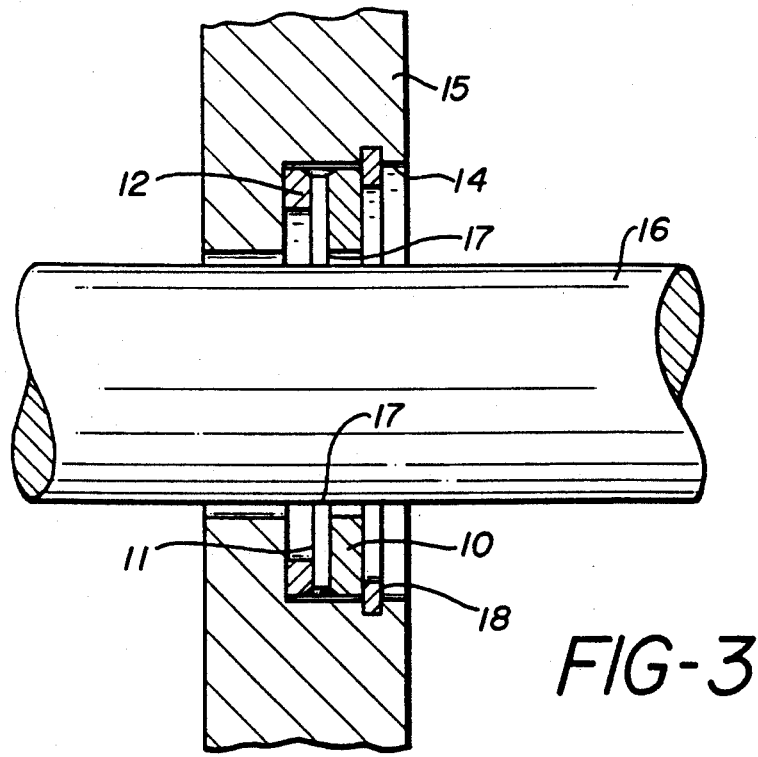
FIG. 3 is a vertical sectional view through a seal assembly utilising a seal as illustrated in FIG. 1.

Specific embodiments of seal member will now be described with reference to the accompanying drawings. FIGS. 1 to 3 show a first embodiment of seal member of this invention, adapted to effect a seal between a shaft and a housing through which the shaft extends, where the shaft is intended to rotate at relatively high rotational rates, such as may be found in a gas turbine or jet engine. The seal comprises an annular carrier 10 generally in the form of a flat plate, a plurality of relatively thin flexible seal strips 11 and a clamp ring 12. The carrier 10, strips 11 and ring 12 all are metallic and are held together by means of a weld bead 13, extending around the outer circumference of all three component parts. As will be appreciated from FIG. 1, the strips 11 all extend at angle to the true radial direction of the annular carrier 10.

As shown in FIG. 3, the carrier is adapted for mounting within a counterbore 14 in a housing 15 through which the shaft 16 extends, the inner ends 17 of the strips 11 then wiping against the shaft extending axially thorough the seal member. The seal is held in position in the counterbore by a circlip 18 sprung into a groove formed in the counterbore 14. For the seal member illustrated in FIG. 1, the shaft 16 must rotate solely in the counterclockwise direction, as viewed in FIG. 1, to allow the inner ends 17 of the strips to wipe over the shaft surface, in a trailing manner.

As shown in FIG. 4, each strip 11 is essentially flat and lies with its plane parallel to a true axial plane. However, each strip 11 could lie with its plane at an angle to the axial direction, as shown in FIG. 5. Yet another possibility is for each strip 11 to be curved across its width, as shown in FIG. 6.

In FIG. 7, a further possibility for the strips is shown, where each strip 18 has a tapering thickness, from its radially outer end 19 where the strip 18 is connected to the carrier 10, towards its radially inner end 20. In this way, the packing density of the strips 18 may be maintained constant, along the length thereof.

In a typical seal member of this invention, adapted for use in sealing in the compressor shaft of a jet engine, each strip could be made of a stainless steel material and have a width of 1.123 mm, and a thickness of 0.075 mm. In use, such a seal member may be expected to give a satisfactory performance for a most extended period of time, during which the strips may maintain their flexibility. When in service, the strips are able to resist without bending gas pressure applied in the direction of arrow B (in FIG. 2) such that the tips of the strips remain in contact with the shaft, notwithstanding that gas pressure.

FIG. 8 is a view similar to that of FIG. 4, but on a conventional bristle-type of brush seal 21. From this, it can be seen that each bristle 22 has a generally circular form, and that there are interstices between the bristles 22 allowing the collection of debris therein. From FIG. 9A it can moreover be seen that the bristles 22 of such a brush seal 21 have a relatively low resistance to bending on account of applied gas pressure in the axial direction, and that such bending results in the tips 23 of the bristles lifting from the shaft being sealed. By contrast, on account of the relatively great stiffness in the axial direction of the strips 11 in a seal member of this invention, as illustrated in FIG. 9B, this disadvantage is overcome, as is the problem of the collection of debris in the interstices in a conventional brush seal.

I claim:
1. A seal assembly, comprising:
  a) a housing defining a bore;
  b) a shaft extending through said bore in the housing and mounted for rotation with respect to the housing; and
  c) a seal member for effecting a seal between said shaft and said housing, which seal member com- prises an annular carrier mounted on one of the housing and the shaft and held against rotation and axial movement with respect thereto, and a plurality of seal elements mounted on the carrier to extend generally radially therefrom, each said seal element having a tip remote from the carrier which tip is adapted to wipe circumferentially over the other of the housing and the shaft to effect a seal thereagainst upon rotation of the shaft, in which seal member each said seal element is in the form of a substantially planar flex bile strip having opposing side surfaces the width of which side surfaces in the general direction of the axis of the carrier is significantly greater than the thickness of the strip in the generally circumferential direction of the carrier, and the adjacent side surfaces of the adjacent seal elements being in contact with each other for at least a portion of the length of the adjacent side surfaces.

2. A seal member as claimed in claim 1, wherein each said flexible seal element is mounted on the carrier with the width of the element lying strictly in an axial plane.

3. A seal member as claimed in claim 1, wherein each said flexible seal element is of a regular and uniform width and thickness through its length.

4. A seal member as claimed in claim 1, wherein each said flexible seal element has a thickness which tapers from the radially outer end of the element towards the radially inner end thereof, whereby the plurality of seal elements may be packed essentially solidly, for the entire radial extent thereof.

5. A seal member as claimed in claim 1, wherein said seal member has an annular carrier adapted for mounting in the housing, with said flexible seal elements extending inwardly from the carrier at and angle to the radial direction such that said seal elements trail having regard to the intended direction of rotation of the shaft.

6. A seal member as claimed in claim 1, wherein a combination of metal flexible seal elements and non-metal flexible seal elements are employed, arranged alternately around said carrier.

7. A seal member according to claim 1, wherein the width of each said flexible seal element is at least five times as great as the thickness of the seal element.

8. A seal member according to claim 7, wherein the width of each said seal element is at least ten times as great as the thickness of the seal element.

* * * * *